(12) United States Patent
Nikitin et al.

(10) Patent No.: US 7,251,106 B2
(45) Date of Patent: Jul. 31, 2007

(54) MAGNETIC HEAD SLIDER HAVING PROTRUSION-COMPENSATED AIR BEARING SURFACE DESIGN

(75) Inventors: Vladimir Nikitin, Campbell, CA (US); Oscar Jaime Ruiz, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 480 days.

(21) Appl. No.: 10/844,862

(22) Filed: May 12, 2004

(65) Prior Publication Data
US 2005/0254174 A1 Nov. 17, 2005

(51) Int. Cl.
*G11B 5/60* (2006.01)
(52) U.S. Cl. .................................. 360/235.7
(58) Field of Classification Search ............. 360/235.4, 360/235.7, 236.3, 236.5, 237
See application file for complete search history.

(56) References Cited

U.S. PATENT DOCUMENTS

| | | | | |
|---|---|---|---|---|
| 5,267,109 | A | 11/1993 | Chapin et al. .............. 360/103 |
| 5,327,310 | A | 7/1994 | Bischoff et al. ............ 360/103 |
| 5,889,634 | A | 3/1999 | Chang et al. ............... 360/103 |
| 6,493,179 | B2 | 12/2002 | Kohira et al. ............. 360/97.01 |
| 6,493,185 | B1 | 12/2002 | Dorius et al. ............. 360/235.7 |
| 6,556,381 | B2 | 4/2003 | Kohira et al. ............. 360/236.3 |
| 6,594,113 | B2 * | 7/2003 | Rao et al. ................. 360/235.8 |
| 6,661,611 | B1 * | 12/2003 | Sannino et al. .......... 360/236.3 |
| 6,937,440 | B2 * | 8/2005 | Rajakumar et al. ...... 360/236.2 |
| 6,989,965 | B2 * | 1/2006 | Mundt et al. ............. 360/235.4 |
| 6,999,282 | B2 * | 2/2006 | Rao ........................... 360/236 |
| 7,123,448 | B1 * | 10/2006 | Boutaghou et al. ...... 360/235.3 |
| 7,154,709 | B2 * | 12/2006 | Rao et al. ................. 360/235.8 |
| 7,164,556 | B2 * | 1/2007 | Kohira et al. ............ 360/235.7 |
| 2001/0013994 | A1 | 8/2001 | Tokisue et al. ........... 360/236.3 |
| 2002/0008939 | A1 | 1/2002 | Boutaghou et al. ...... 360/235.8 |
| 2002/0060881 | A1 * | 5/2002 | Chapin et al. ............ 360/235.8 |
| 2002/0063994 | A1 | 5/2002 | Ueda et al. ............... 360/235.8 |
| 2002/0063995 | A1 * | 5/2002 | Sannino et al. ........... 360/236.3 |
| 2002/0063996 | A1 | 5/2002 | Berg ........................ 360/236.5 |
| 2002/0071215 | A1 | 6/2002 | Lewis et al. .............. 360/235.7 |
| 2002/0075593 | A1 | 6/2002 | Ultican et al. .............. 360/122 |
| 2002/0089789 | A1 | 7/2002 | Baba et al. ............... 360/235.7 |
| 2002/0093765 | A1 | 7/2002 | Bolasna et al. ........... 360/236.1 |
| 2002/0109942 | A1 | 8/2002 | Otsuka ...................... 360/235.7 |

(Continued)

FOREIGN PATENT DOCUMENTS

JP 200298820 10/2000

(Continued)

*Primary Examiner*—Allen Cao
(74) *Attorney, Agent, or Firm*—Robert O. Guillot; Intellectual Property Law Offices

(57) ABSTRACT

A magnetic head slider including a central pad that is disposed at the trailing edge of the slider and designed to increase the flying height of the slider in response to heat induced protrusion of the head elements. The central pad of the present invention includes a body portion and two arm portions which project forwardly from a leading edge of the body portion, such that the leading portion of the central pad is formed with a generally U-shaped profile. The length of the arm members is preferably from approximately ¼ of the total length of the central pad to approximately ¾ of the total length of the central pad.

18 Claims, 3 Drawing Sheets

U.S. PATENT DOCUMENTS

| | | | |
|---|---|---|---|
| 2002/0145829 A1 | 10/2002 | Gates et al. | 360/235.7 |
| 2004/0174638 A1* | 9/2004 | Pendray et al. | 360/235.7 |
| 2005/0099728 A1* | 5/2005 | Deng et al. | 360/236.2 |
| 2006/0082927 A1* | 4/2006 | Hanyu | 360/235.8 |
| 2006/0114611 A1* | 6/2006 | Zhu et al. | 360/235.7 |

FOREIGN PATENT DOCUMENTS

| | | |
|---|---|---|
| JP | 2001006309 | 1/2001 |

* cited by examiner

MAGNETIC HEAD SLIDER HAVING PROTRUSION-COMPENSATED AIR BEARING SURFACE DESIGN

BACKGROUND OF THE INVENTION

1. Field of the Invention

The present invention relates generally to air bearing surface designs for sliders including magnetic heads for hard disk drives, and more particularly to a slider air bearing surface that is designed to adjust its fly height above a disk surface in response to protrusion of portions of the air bearing surface caused by heat generated within the magnetic head.

2. Description of the Prior Art

As is well known to those skilled in the art, standard hard disk drives include magnetic media disks that are rotatably mounted upon a motorized spindle. A magnetic head slider is mounted upon an actuator arm such that the slider flies above the surface of the disk on the moving air film associated with the rotating disk surface. The moving air film is generally referred to as an air bearing, and the flying height of the slider is generally referred to as the air bearing gap.

In the continual quest for higher areal data recording densities of the hard disk drive, it is important that the slider air bearing gap be reduced, such that smaller magnetic data bits can be written to and read from the magnetic media at ever increasing speeds. As is well known to those skilled in the art, at high data writing rates significant heat is created within the magnetic head components and within the rearward portions of the slider located proximate the magnetic head components. The heat causes material expansion within the magnetic head and slider, which causes portions of the magnetic head and slider to protrude outwardly from their nominal locations towards the rotating magnetic media disk. This protrusion substantially reduces the air bearing gap at the protrusion location and increases the likelihood that unwanted physical contact will occur between the rotating disk and the protruding portions of the slider, thereby causing damage to the disk surface or to the protruding magnetic head components of the slider.

Prior art efforts to control the protrusion problem have focused on the fabrication of heat sink structures within the magnetic head components to draw the unwanted heat away from the magnetic head, thereby reducing the protrusion. The present invention utilizes a different strategy by making the slider flying characteristics more sensitive to the protrusion, such that the slider fly height is increased based upon the degree of protrusion and the air bearing gap is not significantly reduced by the protrusion.

SUMMARY OF THE INVENTION

A magnetic head slider of the present invention includes a central pad that is disposed at the trailing edge of the slider, and the magnetic head components are fabricated at the trailing edge of the central pad. The central pad of the slider of the present invention is altered in shape from prior art central pads. That is, the central pad of the present invention may be thought of as including a body portion and two arm portions which project forwardly from a leading edge of the body portion, such that the central pad is formed with a generally U-shaped leading edge. The length of the arm members is preferably from approximately ¼ of the total length of the central pad to approximately ¾ of the length of the central pad.

In a preferred embodiment, the central pad is formed with a width of approximately 100 μm and a body portion length of approximately 100 μm, where the arm members are formed with a length of approximately 100 μm and a width of approximately 20 μm.

It is an advantage of the magnetic head slider of the present invention that heat caused protrusion of the central pad has a minimal effect upon the air bearing gap between the slider and the disk surface.

It is another advantage of the magnetic head slider of the present invention that the flying characteristics of the slider are affected by the protrusion of the central pad, such that the flying height of the slider is increased when protrusion occurs.

It is a further advantage of the magnetic head slider of the present invention that protrusion of the central pad creates an increase in the flying height of the slider, such that the air bearing gap is not substantially affected by the protrusion.

It is an advantage of the hard disk drive of the present invention that it includes a magnetic head slider wherein the heat caused protrusion of the central pad has a minimal effect upon the air bearing gap between the slider and the disk surface.

It is another advantage of the hard disk drive of the present invention that it includes a magnetic head slider wherein the flying characteristics of the slider are affected by the protrusion of the central pad, such that the flying height of the slider is increased when protrusion occurs.

It is a further advantage of the hard disk drive of the present invention that it includes a magnetic head slider wherein the protrusion of the central pad creates an increase in the flying height of the slider, such that the air bearing gap is not substantially affected by the protrusion.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
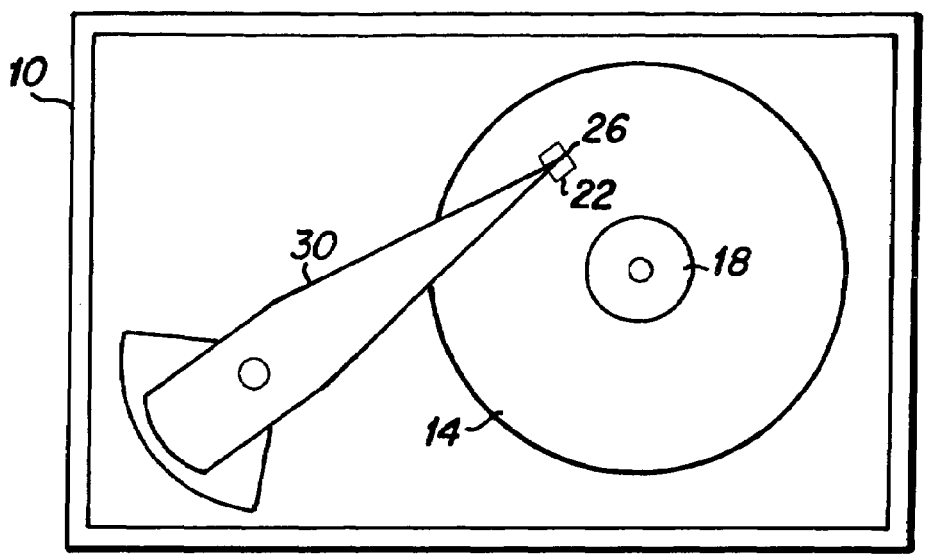
FIG. 1 is a simplified depiction of a hard disk drive of the present invention.

A simplified top plan view of a typical hard disk drive 10 which includes a magnetic head of the present invention is presented in FIG. 1. As depicted therein, at least one hard disk 14 is rotatably mounted upon a motorized spindle 18.

A slider 22, having a magnetic head 26 disposed thereon, is mounted upon an actuator arm 30 to fly above the surface of each rotating hard disk 14, as is well known to those skilled in the art. The present invention includes improved features for such magnetic head sliders.

Figure 2:
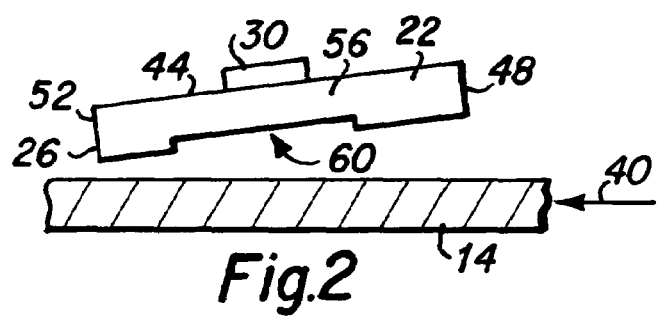
FIG. 2 is a side elevational view depicting a slider of the present invention disposed above a surface of a disk of the hard disk drive depicted in FIG. 1.

FIG. 2 is a side elevational view depicting a magnetic head slider 22 disposed above the surface of a rotating disk 14; the direction of disk rotation is indicated by the arrow 40. The slider includes a top surface 44 that is engaged to the actuator arm 30, a front leading edge 48, a trailing rear edge 52, two side edges 56 (one of which is shown in FIG. 2), and a lower surface 60 that is commonly referred to as the air bearing surface (ABS) of the slider, and which is disposed proximate the disk surface. As is well known to those skilled in the art, the air bearing surface 60 is formed with precisely positioned outer surfaces, intermediate surfaces and inner surfaces that control the air bearing flight characteristics of the slider 22 relative to the moving air film that exists immediately above the surface of the rotating disk 14. A detailed description of the air bearing surface is presented herebelow with the aid if FIG. 3. As can be seen in FIG. 2, during disk drive operation the slider 22 is preferably disposed at an angle relative to the disk surface 14 such that the leading edge 48 flies higher above the disk surface than the trailing edge 52. The magnetic head components 26, such as a magnetoresistive read head component and an inductive write head component are located at the lower portion of the trailing edge 52 of the slider, such that they are disposed close to the magnetic media disk surface, in order to more accurately and rapidly read and write magnetic data bits to the rotating magnetic media.

Figure 3:
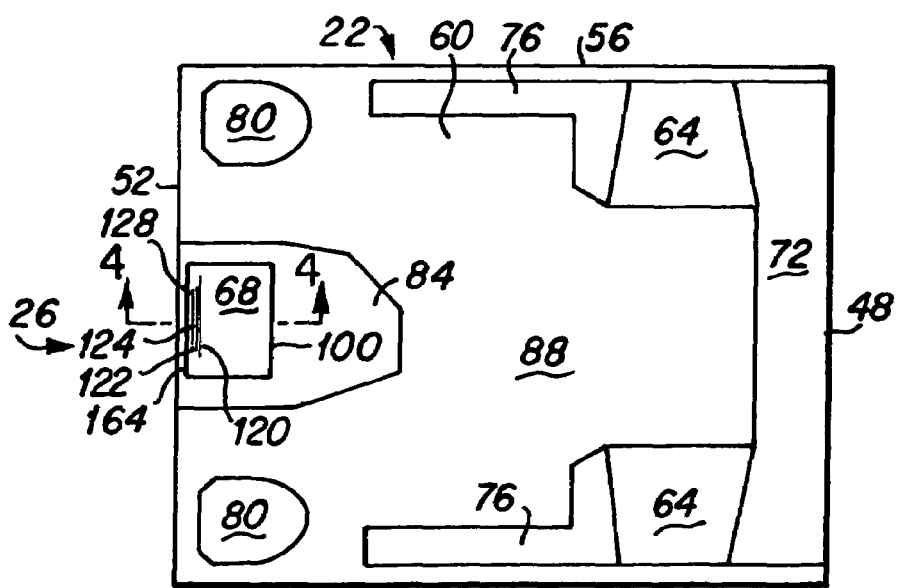
FIG. 3 is a plan view depicting a typical prior art slider air bearing surface.

FIG. 3 is a plan view depicting a typical air bearing surface 60 of a prior art slider 22. As depicted therein, the air bearing surface 60 of the slider 22 includes a leading edge 48, a trailing edge 52 and side edges 56. A typical slider is formed with a side edge length of approximately 1,200 μm and a leading and trailing edge width of approximately 1,000 μm. The air bearing surface 60 is fabricated in a series of etching steps, where, initially, frontward left and right pad areas 64 and a rearward central pad area 68 are masked and the remaining exposed surface area of the slider is etched down to an intermediate surface level. The typical first etching is from approximately 0.05 μm to approximately 0.5 μm, and typically around 0.20 μm. Thereafter, further masking is done to cover the frontward intermediate surface 72, the left and side edge intermediate surfaces 76, the rearward left and right intermediate surfaces 80 and a rearward central intermediate surface 84. Further etching is then conducted to remove material from the unmasked central regions to create an inner surface 88. The additional etching depth is from approximately 0.5 μm to approximately 5 μm with a typical depth being approximately 1.5 μm. Following the second etching step, the second and first mask layers are removed. This results in a three level air bearing surface having outer surfaces 64 and 68, intermediate surfaces 72, 76, 80 and 84 and the inner surface 88. The central pad 68 is typically formed with a leading edge 100 and a trailing edge 104 that is located proximate the trailing edge 52 of the slider. The central pad 68 typically has a trailing edge width of approximately 200 to 400 μm and a central length of approximately 100 to 400 μm.

The magnetic head components 26 are located at the lowermost portion of the trailing edge 104 of the central pad 68 such that they will be disposed in closest proximity to the disk surface. As is well known to those skilled in the art, the magnetic head components are fabricated in a series of material deposition and removal steps that occur when the slider is part of a magnetic head fabrication disk, and the individual sliders are sliced and diced from the disk following the fabrication of the magnetic head components. Typical magnetic head components include a first magnetic shield (S1) 120, a magnetoresistive read head element (not shown), a second magnetic shield (S2) (not shown), a first magnetic pole (P1) 122, an induction coil 124, and a second magnetic pole (P2) 128. When the magnetic head is utilized to write magnetic data bits to the magnetic media disk, electrical current is passed through the induction coil 124, causing magnetic flux to flow through the P1 and P2 magnetic poles. The magnetic flux flows across a gap at the air bearing surface between the two magnetic poles, and the magnetic flux flow between the poles occurs in such close proximity to the magnetic media disk 14 that magnetic data bits are formed in the magnetic media, as is well known to those skilled in the art.

Figure 4:
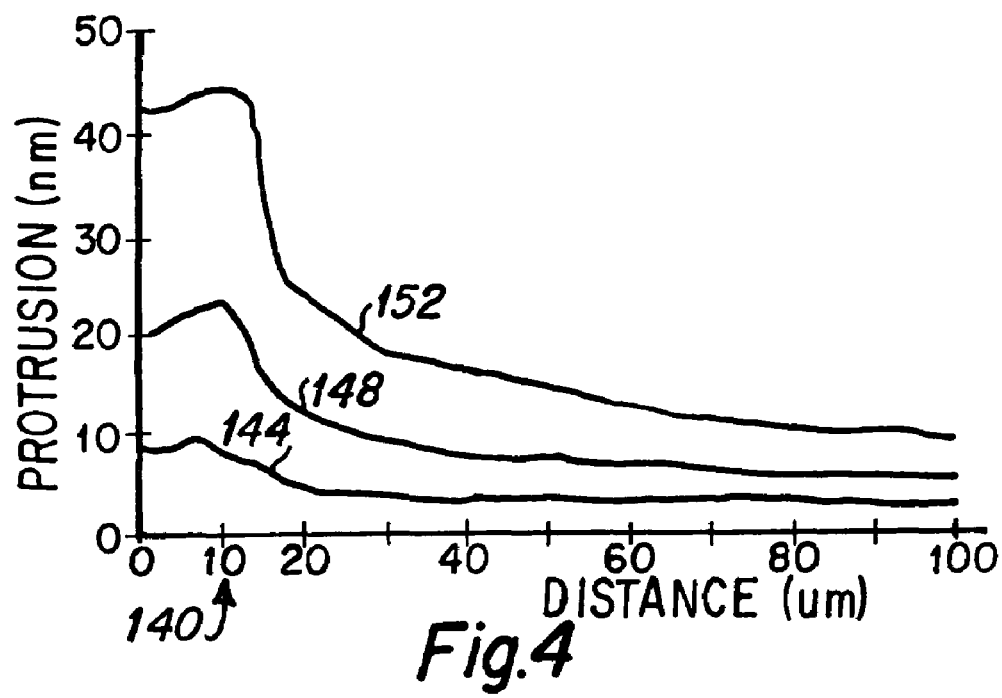
FIG. 4 is a chart depicting the relationship between protrusion of the air bearing surface and electrical current through the inductive magnetic head.

Significantly, an undesirable quantity of heat is created within the induction coil and magnetic poles during the writing process, and this heat causes the magnetic head materials and the materials of the central pad located proximate the magnetic head to expand. This expansion of materials creates unwanted protrusion of rearward portions of the central pad outwardly from their nominal location, and FIG. 4 is a graphical presentation of a protrusion profile taken on lines 4-4 of FIG. 3 through the middle of the central pad 68. As presented in FIG. 4, graphical location zero corresponds to the trailing edge 104 of the central pad 68 and arrow 140 is provided at approximately 8 μm inward from the trailing edge to identify the location of the S1 shield 120 of the magnetic head components. The three heat protrusion profiles 144, 148 and 152 provided in FIG. 4 correspond to three different write head currents of 67 mA, 100 mA and 134 mA respectively. As can be seen, the heat caused protrusion is greatest for the highest write head current of profile 152.

With reference to the flying slider depicted in FIG. 2, it can be understood that the unwanted protrusion of the rearward portions (proximate the head components 26) of the central pad 68 will cause these portions of the central pad to project downwardly towards the moving media disk 14. The amount of protrusion can be quite significant. That is, where a typical write head current will be approximately 35-40 mA, a typical heat induced protrusion will be approximately 3 to 5 nm. Where the desired air bearing gap is approximately 20 nm to 10 nm, the heat induced protrusion of the rearward portion of the central pad of approximately 3 to 5 nm results in the effective air bearing gap being significantly reduced. This can lead to an increase in unwanted contact between the protruding central pad area and the disk surface, which can cause damage to the magnetic head components as well as damage to portions of the data disk where the unwanted slider contact occurs.

The magnetic head protrusion and the unwanted head/disk contact has become an increasing problem in more advanced disk drives. That is, to increase the areal data storage density of hard disk drives, it is necessary to reduce the air bearing gap and increase the induction coil current, such that a more concentrated, narrowly defined magnetic flux flow is created across the pole gap to more rapidly write smaller data bits to the magnetic media. A smaller air bearing gap is also required to locate the read head sensor closer to the magnetic media in order to more rapidly read the smaller data bits from the magnetic disk. These factors have generally increased the significance of the unwanted heat induced protrusion of the magnetic head components, in that the increased writing current creates more heat within the magnetic head, such that the protrusion increases, where, at the same time, the air bearing gap is being reduced in order to increase the areal data storage density.

One approach to solving the heat induced protrusion problem is to fabricate heat sink structures within the magnetic head that attempt to draw the unwanted heat away from the air bearing surface, thereby reducing the heat induced expansion of the magnetic head materials and thus reducing the protrusion. The present invention implements a different approach. As is depicted and described hereinbelow, in the present invention, the shape of the central pad on the air bearing surface is altered, such that the fly height of the magnetic sensor element is made more sensitive to the shape of the central pad. As a result, when protrusion of the central pad occurs, the air bearing pressure reacts to the presence of the protrusion producing a lift that raises the fly height of the magnetic sensor element. When the magnetic sensor element of the slider raises upward, the air bearing gap between the trailing edge of the slider and disk surface is increased, whereby the detrimental effects of the protrusion are reduced. Improved control of the size of the ABS gap during device usage is obtained, and unwanted contact between the protruding central head area and the disk surface is thereby reduced or eliminated. An air bearing surface of a slider of the present invention is next described in detail with the aid of FIG. 5.

Figure 5:
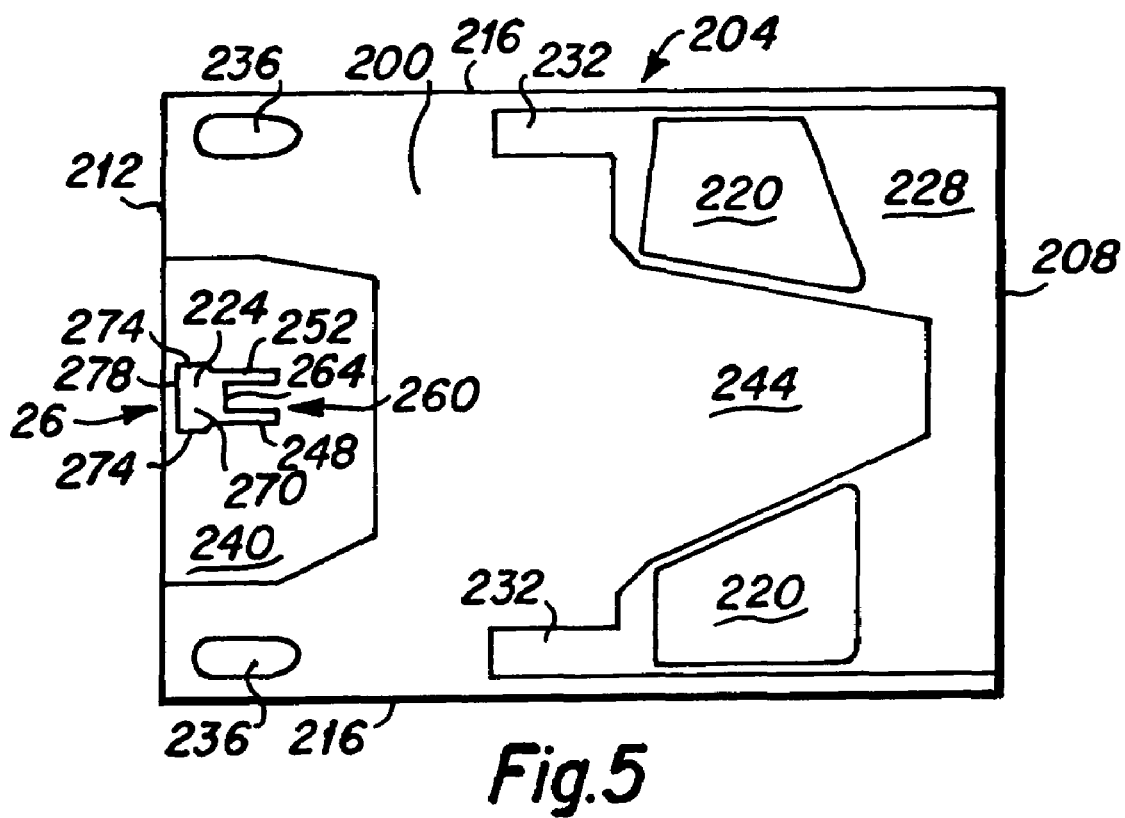
FIG. 5 is a plan view depicting the air bearing surface of a slider of the present invention.

FIG. 5 is a plan view depicting the air bearing surface 200 of a slider 204 of the present invention. As depicted therein, the air bearing surface of the slider includes a leading edge 208, a trailing edge 212, and left and right side edges 216. The air bearing surface is fabricated in a similar manner to the air bearing surface 60 of the prior art slider 22 depicted in FIG. 3. That is, initial masking of the frontward left and right surfaces 220 and the rearward central pad 224, followed by ion milling to create the frontward intermediate surface 228, side intermediate surfaces 232, the rearward left and right intermediate surfaces 236, and the central intermediate surface 240. Additional masking of these intermediate surfaces is next accomplished, followed by further milling to create the inner central surface 244. The depth of the intermediate surfaces is from approximately 0.05 µm to approximately 0.5 µm, with a preferred depth of approximately 0.18 µm, and the additional depth of the inner surface is from approximately 0.5 µm to approximately 5 µm with a preferred additional depth of approximately 1.5 µm. The present invention is not to be so limited to these particular air bearing surface features, and air bearing surfaces having differently located and shaped outer and intermediate surfaces are within the scope of the present invention. The significant features of the air bearing surface of the present invention relate to the location and shape of the central pad 224 as are next described.

As indicated hereabove, it is a feature of the present invention that the lifting properties of the air bearing surface of the slider are more significantly controlled by the shape and size of the central pad. Where this is accomplished, the heat induced protrusion of the rearward portion of the central pad more significantly affects the pressure under the air bearing surface of the slider, such that the trailing edge of the slider is raised as the protrusion occurs. Returning to FIG. 5, the central pad 224 of the present invention is preferably formed with two projecting arm members 248 and 252 that project forwardly towards the leading edge 208 of the slider, such that the leading edge 260 of the central pad 224 has a generally U-shaped profile, including the two projecting arms 248 and 252 with a portion 264 of the leading edge of the central pad located between the two arms. The rearward body portion 270 of the central pad 224 is generally though not necessarily rectangularly shaped, with side edges 274 and a trailing edge 278. The magnetic head components 26 are located at the trailing edge 278 of the central pad 224. The length of the arms 248 and 252 is generally from approximately ¼ of the total length of the central pad to approximately ¾ of the total length of the central pad 224. The arm members of the present invention are not to be limited to the rectangular shape and paralleled projection depicted in FIG. 5, but rather they are intended to include other shapes which nevertheless act to direct air flow across the protruding central pad rear area proximate the magnetic head components 26.

In a specific embodiment of the present invention, where the overall dimensions of the slider include a width of approximately 1,000 µm and a length of approximately 1,200 µm, the central pad 224 has a trailing edge width of approximately 100 µm, and a body length of approximately 100 µm, the two projecting arms each project a length of from approximately 30 µm to approximately 300 µm with a preferred length of approximately 100 µm, and each arm has a width of approximately 20 µm, such that the central pad leading edge 264 between the two arms has a width of approximately 60 µm.

The projecting arms of the U-shaped central pad aid in increasing the sensitivity of the slider fly height to the protrusion of the central pad. Specifically, the projecting arms 248 and 252 help maximize the load capacity per unit area of the air bearing surface 270, which is located precisely where the protrusion occurs. The protrusion therefore projects into an area that is theoretically the most sensitive to spacing variations and the air bearing pressure reacts trying to compensate for the lost spacing.

As indicated above, when protrusion occurs the protruding central pad projects into the moving air flow beneath the central pad, and as a result the fly height of the trailing edge 212 of the slider 204 increases, and the air bearing gap between the magnetic head components and the disk surface is thus increased.

Figure 6:
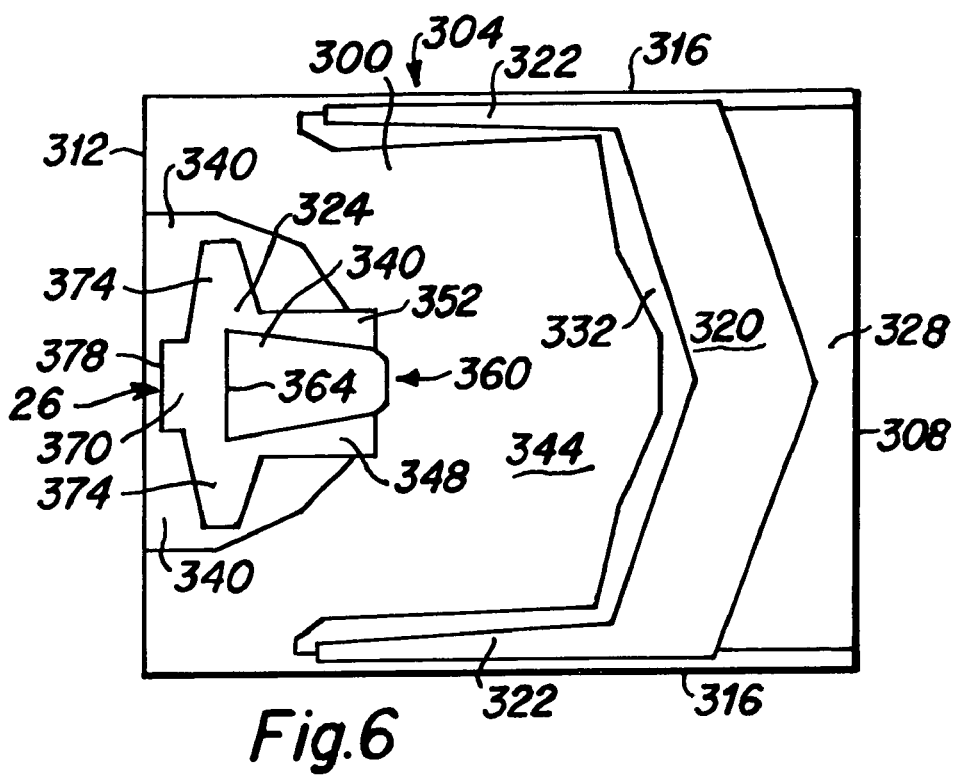
FIG. 6 is a plan view depicting the air bearing surface of an alternative slider of the present invention.

FIG. 6 is a plan view depicting the air bearing surface 300 of an alternative slider 304 of the present invention. As depicted therein, the air bearing surface of the slider includes a leading edge 308, a trailing edge 312, and left and right side edge 316. The air bearing surface 300 is fabricated in a similar manner to the air bearing surfaces 60 and 120 of the sliders 22 and 204 depicted in FIGS. 3 and 5 respectively. That is, initial masking of the frontward V-shaped surface 320 with side edges 322 and the rearward central pad 324, followed by ion milling to create the frontward intermediate surface 328, central intermediate surfaces 332, and the rearward intermediate surfaces 340. Additional masking of these intermediate surfaces is accomplished, followed by further milling to create the inner central surface 344. The depth of the intermediate surfaces is from approximately 0.05 µm to approximately 0.5 µm, with a preferred depth of approximately 0.20 µm, and the additional depth of the inner surface is from approximately 0.5 µm to approximately 5 µm with a preferred additional depth of approximately 1.5 µm. It is to be noted that these features of the air bearing surface 300 of the slider of the present invention are substantially similar to the features of the air bearing surface 200 depicted in FIG. 5. However, the present invention is not to be so limited to these particular air bearing surface features, and air bearing surfaces having differently located and shaped outer and intermediate surfaces are within the scope of the present invention. The significant features of the air bearing surface 300 of the present invention relate to the location and shape of the central pad 324 as are next described.

The central pad 324 of the slider 304 is preferably formed with two projecting arm members 348 and 352 that project forwardly towards the leading edge 308 of the slider, such that the leading edge 360 of the central pad 324 has a generally U-shaped profile, including the two projecting arms 348 and 352 with a portion 364 of the leading edge of the central pad located between the two arms. The rearward body portion 370 of the central pad 324 includes two sideways projecting portions 374 and a trailing edge 378. The magnetic head components 26 are located at the trailing edge 378 of the central pad 324. The length of the arms 348 and 352 is generally from approximately ¼ of the total length of the central pad 324 to approximately ¾ of the total length of the central pad 324.

In a specific embodiment of the present invention, where the overall dimensions of the slider include a width of approximately 1,000 μm and a length of approximately 1,200 μm, the central pad 324 has a trailing edge width of approximately 100 μm, and sideways projecting body members 374 that extend approximately 100 μm, the two projecting arms each project a length of from approximately 30 μm to approximately 300 μm with a preferred length of approximately 100 μm, and each arm has an outer width of approximately 30 μm and an inner width of approximately 15 μm, such that the central pad leading edge 364 between the two arms has a width of approximately 150 μm. The total length of the central pad 324 is approximately 200 μm The projecting arms of the U-shaped central pad aid in increasing the sensitivity of the slider fly height to the protrusion of the central pad. Specifically, the projecting arms 348 and 352 help maximize the load capacity per unit area of the air bearing surface 370, which is located precisely where the protrusion occurs. The protrusion therefore projects into an area that is theoretically the most sensitive to spacing variations and the air bearing pressure reacts trying to compensate for the lost spacing.

As indicated above, when protrusion occurs the protruding central pad projects into the moving air flow beneath the central pad, and as a result the fly height of the trailing edge 312 of the slider 304 increases, and the air bearing gap between the magnetic head components and the disk surface is thus increased.

Figure 7:
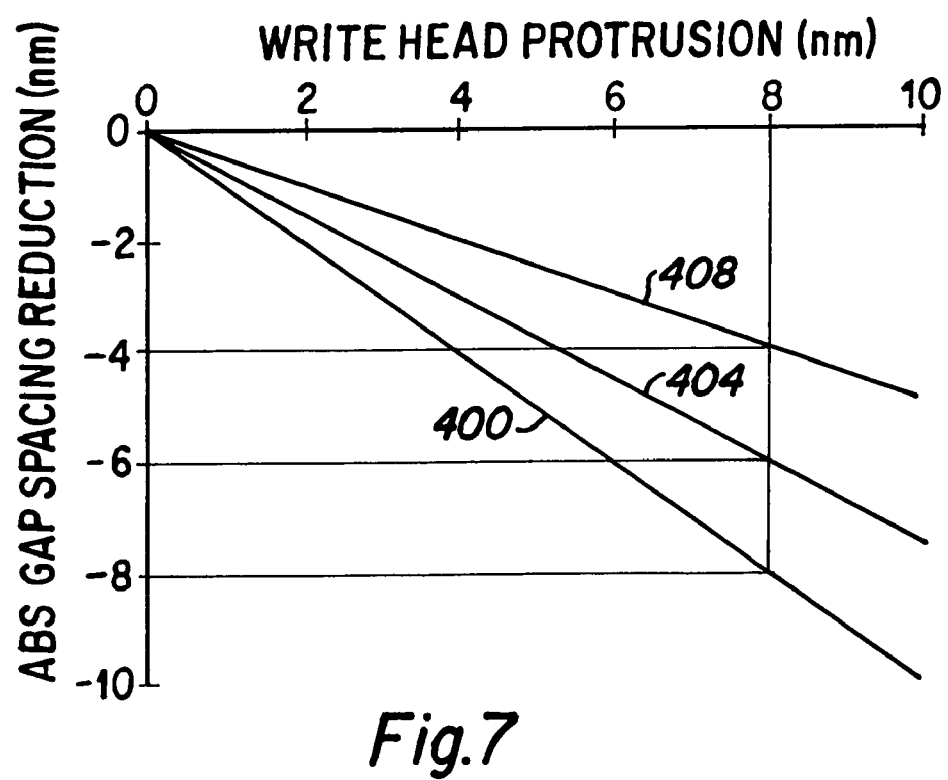
FIG. 7 is a graph depicting the air bearing gap reduction of the present invention.

FIG. 7 is a graph that depicts the relationship between the height of protrusion of a head and the reduction in the ABS gap, as achieved in the present invention. The diagonal line 400 represents the prior art in which a protrusion of perhaps 8 nm corresponds to a air bearing gap reduction of 8 nm. That is, in the prior art head there is no elevation of the trailing edge of the slider as a result of the protrusion. Line 404 represents the improvement obtained from the head 204 of the present invention. As can be seen, a protrusion height of 8 nm results in an air bearing gap reduction of approximately 6 nm. That is, due to the shape of the central pad 224 of the slider 204, the trailing edge raised a distance of 2 nm. Line 408 represents the slider embodiment 304, and indicates that a head protrusion of 8 nm results in an air bearing gap reduction of approximately 4 nm, indicating that the trailing edge of the slider 304 was raised approximately 4 nm due to the aerodynamic properties of the air bearing surface with the central pad 324.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What I claim is:

1. A magnetic head slider for a hard disk drive, comprising:
    a slider body having a leading edge and a trailing edge and an air bearing surface (ABS) disposed between said leading edge and said wailing edge;
    said ABS including a central pad that is disposed proximate said trailing edge;
    said central pad including a generally U-shaped forward portion and a rearwardly disposed body portion, said body portion having two sideways projecting portions and a trailing edge where magnetic head components are disposed.

2. A magnetic head slider as described in claim 1 wherein said U-shaped forward portion of said central pad includes two arm members that project forwardly from said central pad body portion, and where a leading edge of said central pad is disposed between said two arm members.

3. A magnetic head slider as described in claim 1 wherein said body portion of said central pad has a leading edge and a trailing edge and a left side and a right side, and wherein said U-shaped forward portion includes a left arm member that projects forwardly from said central pad leading edge at said left side, and a right arm member that projects forwardly from said central pad leading edge at said right side, and wherein a first said sideways projecting portion projects from said left side and a second said sideways projecting portion projects from said right side.

4. A magnetic head slider as described in claim 2, wherein said arm members each have a length that is from ¼ of a total length of said central pad to a length which is approximately ¾ of said total length of said central pad.

5. A magnetic head slider as described in claim 3 wherein said body portion of said central pad has a length L of approximately 100 μm and a width W of approximately 100 μm, and wherein said arm members have a length of from approximately 30 μm to approximately 300 μm, and wherein said first sideways projecting portion extends approximately 100 μm from said left side of said body portion, and wherein said second sideways projecting portion extends approximately 100 μm from said right side of said body portion.

6. A magnetic head slider as described in claim 5 wherein said arm members are generally rectangular and have a width of approximately 20 μm.

7. A magnetic head slider for a hard disk drive, comprising:
    a slider body having a leading edge, a left side edge, a right side edge and a trailing edge and an air bearing surface (ABS) disposed between said leading edge and said trailing edge;
    said ABS including projecting members having flat surfaces that define an outermost planar surface of said ABS;
    said ABS including a central pad that is disposed proximate said trailing edge, said central pad including a flat surface portion that is coplanar with said outermost planar surface of said ABS;
    said central pad including a body portion having two sideways projecting members and two forwardly projecting arms and a trailing edge that is disposed proximate said trailing edge of the slider;
    wherein said body portion of said central pad has a length of approximately 100 μm, and wherein a first one of said sideways projecting members projects approximately 100 μm from said body portion towards said left side edge, and wherein a second one of said sideways projecting members projects approximately 100 μm from said body portion towards said right side edge, and wherein each of said arms is formed with a length that is from approximately ¼ a total length of said central pad to approximately ¾ of said total length of said central pad;

and wherein magnetic head components are fabricated proximate said trailing edge of said central pad.

8. A magnetic head slider as described in claim 7 wherein said arm members have a length of approximately 30 μm to approximately 300 μm.

9. A magnetic head slider as described in claim 8 wherein said slider body is formed with a width of approximately 1,000 μm and a length of approximately 1,200 μm.

10. A hard disk drive, comprising:
at least one hard disk being adapted for rotary motion upon a disk drive;
at least one magnetic head slider being adapted to fly over said hard disk, said magnetic head slider including:
a slider body having a leading edge and a trailing edge and an air bearing surface (ABS) disposed between said leading edge and said leading edge;
said ABS including a central pad that is disposed proximate said trailing edge;
aid central pad including a generally U-shaped forward portion and a rearwardly disposed body portion, said body portion having two sideways projecting portions and a trailing edge where magnetic head components are disposed.

11. A hard disk drive as described in claim 10 wherein said U-shaped forward portion of said central pad includes two arm members that project forwardly from said central pad body portion, and where a leading edge of said central pad is disposed between said two arm members.

12. A hard disk drive as described in claim 10 wherein said body portion of said central pad has a leading edge and a trailing edge and a left side and a right side, and wherein said U-shaped fox-ward portion includes a Left arm member that projects forwardly from said central pad leading edge at said left side, and a right arm member that projects forwardly from said central pad leading edge at said right side, and wherein a first said sideways projecting portion projects from said left side of said body portion and a second said sideways projecting portion projects from said right side of said body portion.

13. A hard disk drive as described in claim 11, wherein said arm members each have a length that is from ¼ of a total length of said central pad to a length which is approximately ¾ of said total length of said central pad.

14. A hard disk drive as described in claim 12 wherein said body portion of said central pad has a length L of approximately 100 μm and a width W of approximately 100 μm, and wherein said arm members have a length of from approximately 30 μm to approximately 300 μm. and wherein said first sideways projecting portion extends approximately 100 μm from said left side of said body portion, and wherein said second sideways projecting portion extends approximately 100 μm from said right side of said body portion.

15. A hard disk drive as described in claim 14 wherein said arm members are generally rectangular and have a width of approximately 20 μm.

16. A hard disk drive including a magnetic bead slider, comprising:
a slider body having a leading edge, a left side edge, a right side edge and a trailing edge and an air bearing surface (ABS) disposed between said leading edge and said trailing edge;
said ABS including projecting members having flat surfaces that define an outermost planar surface of said ABS;
said ABS including a central pad that is disposed proximate said trailing edge, said central pad including a flat surface portion that is coplanar with said outermost planar surface of said ABS;
said central pad including a body portion having two sideways projecting members and two forwardly projecting arms and a tailing edge that is disposed proximate said trailing edge of the slider;
wherein said body portion of said central pad has a length of approximately 100 μm, and wherein a first one of said sideways projecting members projects approximately 100 μm from said body portion towards said left side edge, and wherein a second one of said sideways projecting members projects approximately 100 μm from said body portion towards said right side edge, and wherein each of said arms is formed with a length that is from approximately ¼ of a total length of said central pad to approximately ¾ of said total length of said central pad;
and wherein magnetic head components are fabricated proximate said trailing edge of said central pad.

17. A hard disk drive including a magnetic head slider as described in claim 16 wherein said arm members have a length of approximately 30 μm to approximately 300 μm.

18. A hard disk drive including a magnetic head slider as described in claim 17 wherein said slider body is formed with a width of approximately 1,000 μm and a length of approximately 1,200 μm.

* * * * *